United States Patent [19]

Tullier et al.

[11] 4,009,109
[45] Feb. 22, 1977

[54] FLUID FILTER FLOW ARRANGEMENT

[76] Inventors: Leo D. Tullier, 4727 Bayou Vista, Houston, Tex. 77018; John F. Vignone, 8282 61 Drive, Flushing, N.Y. 11379

[22] Filed: Dec. 15, 1975

[21] Appl. No.: 641,098

[52] U.S. Cl. .................................. 210/447; 55/481
[51] Int. Cl.[2] .......................................... C02C 1/14
[58] Field of Search .......... 210/236, 435, 445, 447, 210/451, 453, 497.1, 411; 55/481

[56] References Cited

UNITED STATES PATENTS

| | | | |
|---|---|---|---|
| 2,530,283 | 11/1950 | Brown | 210/445 |
| 3,481,474 | 12/1969 | Paulson | 210/497.1 |
| 3,552,552 | 1/1971 | Johnston | 210/447 |

OTHER PUBLICATIONS

Steam Strainer — Schutte & Koerting Co. Ltd. Nov. 1954 p. 14.

Primary Examiner—Bernard Nozick
Attorney, Agent, or Firm—Jack W. Hayden

[57] ABSTRACT

A T connection including a body and a pair of aligned laterally extending projections form fluid passage means. An annular flange is formed on one of the lateral projections internally thereof and a flange is formed on the other lateral projection externally. A hollow annular filter member is positioned in the lateral projections and abuts the internal flange at one end and is closed off at the other end by the external flange on the other lateral projection. The filter member includes a core formed of generally trapezoidal or triangular shaped metal wire or strip material which has in the trapezoidal form two parallel surfaces joined by converging side surfaces. The strip material is either helically wound to form coils or formed by a plurality of rings which are longitudinally spaced a predetermined amount and a plurality of circumferentially spaced reinforcing ribs are secured to the periphery of the core.

5 Claims, 4 Drawing Figures

FLUID FILTER FLOW ARRANGEMENT

SUMMARY OF THE INVENTION

It is desirable in some circumstances to filter fluid flow to remove contaminants therefrom, and to filter such fluid flow in a manner so as to create turbulence, or to maintain turbulence at a minimum.

An object of the present invention is to provide a relatively simple arrangement which can be positioned in a fluid flow line for filtering thereof and which may be removed from the fluid flow line with relative ease for repair or replacement thereof.

An object of the present invention is to provide a relatively simple arrangement which can be positioned in a fluid flow line for filtering thereof and which may be removed from the fluid flow line with relative ease for repair or replacement thereof and a valve means for blow down of the filter arrangement.

Other objects and advantages of the invention will become more readily apparent from a consideration of the following description and drawings.

BRIEF DESCRIPTION OF THE PREFERRED EMBODIMENTS

Figure 2:
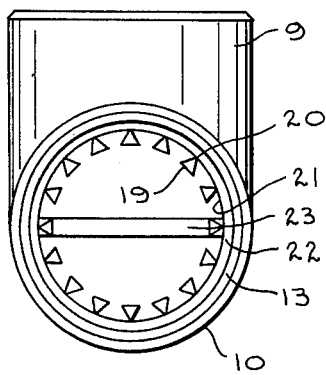
FIG. 2 is an end view on the line 2—2 of FIG. 1.
Figure 1:
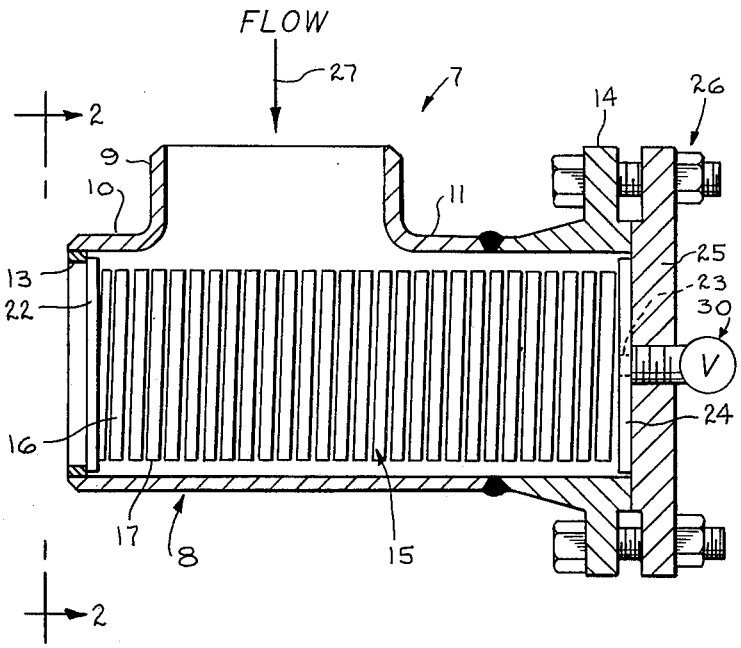
FIG. 1 is a sectional view illustrating an arrangement of the present invention.

Attention is directed to FIG. 1 of the drawings wherein in the arrangement for filtering flow is illustrated generally by the numeral 7. Such arrangement includes the T connection referred to generally at 8 and including a hollow body having a hollow projection 9 integrally formed with aligned hollow projections 10 and 11 extending laterally from the projection 9 of the body as shown for forming fluid flow passage means.

An annular flange 13 is positioned internally of one of the lateral projections 10, and an external projection 14 is formed on the other lateral projection 11 as shown in the drawings.

A hollow annular filter member referred to generally at 15 is adapted to be positioned in the T connection 8 for filtering fluid flow conducted therethrough. The filter member includes a core 16 which may be formed of a continuous strip of material, such as metal, or other suitable material of generally trapezoidal shape. The strip has an inner and outer flat surface with one surface being wider than the other surface. The surfaces are joined by edge or side surfaces which converge from the wider surface to the surface more narrow in width. The inner and outer surfaces form the inner and outer periphery of the core 16. The strip is helically wound to form the core by coils 17 longitudinally spaced a predetermined amount depending upon the type of fluid to be filtered thereby. In some instances the core may be formed by a plurality of triangular shaped rings which have a flat base with converging sides. The rings are positioned in spaced relationship to filter fluid flowing between the spaces.

A plurality of spaced ribs 19 are provided to reinforce the core 16, with the edge 20 of the ribs being secured to the inner periphery 21 of the core 16 in the form shown in FIG. 1 of the drawings.

An annular flange 22 is mounted adjacent one end of the core 16 which abuts the internal flange 13 as shown in FIG. 1 of the drawings for seating and positioning the core 16 within the connection 8.

The other end 24 of the core is provided with a member 23 extending thereacross which may be manually grasped to remove core 16 when flange 25 is removed. The annular flange 25 is secured to the external flange 14 by suitable means such as the nut and bolt arrangement referred to generally at 26. When the flow of fluid is in the direction as represented by the arrow 27 as shown in FIG. 1, the flow will pass through the spaces 17a formed between the coils 16. As noted previously the core 16 may be formed of a continuous strip of material of trapezoidal shape with the inner and outer periphery thereof having flat parallel surfaces, and the extent or width of the surface of the coil 17 facing in the direction from which flow of fluid is occurring is greater than the extent of the surface on the inner periphery thereof in the form of the filter member shown in FIG. 1 of the drawings. The coils are spaced a predetermined amount to provide a space therebetween of desired extent which functions to filter the fluid flowing therethrough. Thus, any contaminants in the fluid flow stream larger than the spaces 17a at the outer surface of core 16 facing downstream as represented by the arrow 27 will not pass through the space 17a. The core 16 when formed of rings which are mounted on ribs 19 in spaced relation functions in the same manner.

Figure 4:
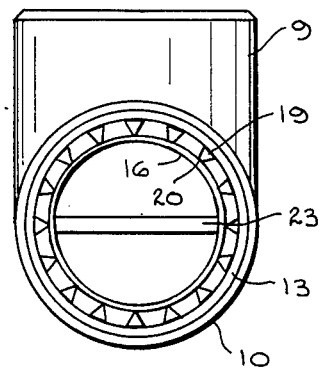
FIG. 4 is an end view on the line 4—4 of FIG. 3.
Figure 3:
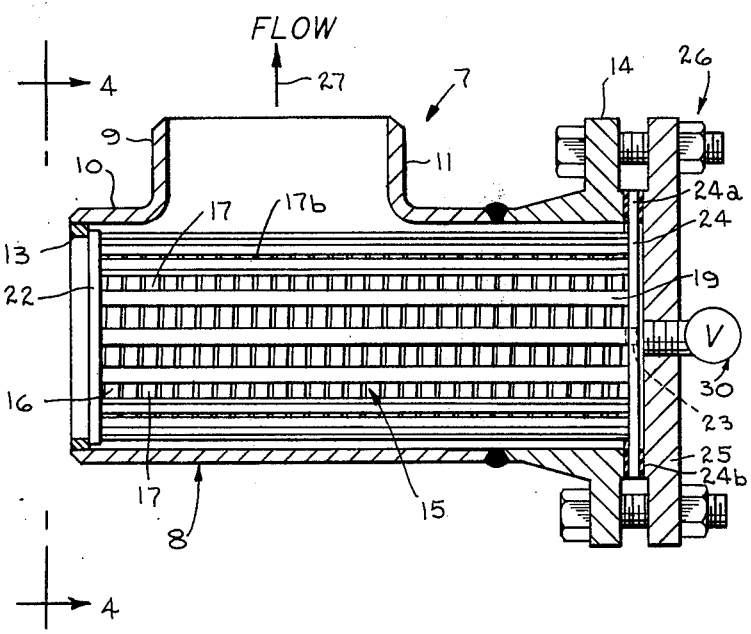
FIG. 3 is a sectional view similar to FIG. 1 showing an alternate form of the filter member.

In FIG. 3, it will be noted that the direction of flow represented by the arrow 27 is such that the flow enters the end of the filter member and passes interiorly thereof to be discharged through the exterior. The arrangement 7 again includes the T connection 8 with the hollow body including hollow projection 9 and hollow lateral projections 10 and 11 as well as the flange arrangement 13, 14 and 25 described with regard to FIG. 1. However, the filter member is slightly modified when the flow is reversed from that as shown in FIG. 1 of the drawing. In FIG. 3 the filter member again includes a core 16 which may be formed of a continuous strip of metal, or other suitable material of generally trapezoidal shape with the inner and outer periphery of such annular filter member being parallel and the side edges converging from the surface of larger width to the surface of smaller width. It may be also formed by spaced triangular rings having a flat base and sloping sides. However, since the flow is reversed in the FIGS. 3 and 4 modification, the coils 17 will have the surface which is wider positioned internally of the core 16 rather than on the outer periphery thereof as in FIG. 1 so that in this instance the spaces 17b will be larger on the outside than on the inside of the core.

In the FIG. 1 modification by reason of the parallel inner and outer peripheries on the core 16 and the converging side surfaces of the trapezoidal strips forming the coils 17, the spaces 17a between the coils 17 gradually increase from the exterior to the interior whereas in FIG. 3 the spaces 17b gradually increase from the interior to the exterior of the coil 16.

In the FIG. 3 form, it will again be noted that ribs 19 extend longitudinally and are spaced circumferentially of the core 16. One edge 20 of each rib 19 is secured to the outer circumference or outer periphery of the core 16 as shown. The configuration of the longitudinally extending reinforcing ribs 19 does not interfere with flow through core 16 so that filtering of the fluid flow either by the FIG. 1 or FIG. 3 form may be accomplished in a manner so as to inhibit turbulence and to provide a more laminar flow of fluid through the arrangement.

The core 16 is shown in FIG. 3 as having an annular flange 24a of substantially greater diameter than the core 16. The flange 24a extends radially a sufficient distance to fit between the flanges 14 and 25 as shown. A sealing gasket 24b is positioned on each side of the annular flange between the annular flange 24a and the adjacent external flange to inhibit leakage. The flanges 14 and 25 are then connected by the nut and bolt arrangement 26.

When it is necessary to replace the filter member 15, the flange 25 may be removed by loosening the bolts 26 for access thereto and the member 23 grasped for removal of core 16.

Also, the valving arrangement represented at 30 is shown in FIGS. 1 and 3 as being secured to the external flange 25 for blow down of the filter member 15 when desired.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for filtering fluid flow in a conduit comprising:
   a. a T connection having a body including a hollow projection and a pair of aligned hollow projections extending laterally therefrom for forming flow passages and to form a filter receiving section of uniform size throughout its longitudinal extent;
   b. an inwardly extending annular flange formed on one of said aligned hollow projections and projecting radially inwardly of said aligned hollow projections to define one end of the filter receiving section;
   c. an external annular flange formed on the other of said projections;
   d. a hollow annular filter member positioned in the filter receiving section formed by said lateral projections, said annular filter member including:
      1. a core formed of coils spaced a predetermined amount;
      2. a plurality of circumferentially spaced ribs extending longitudinally of said core;
      3. said ribs having a surface secured to said core;
      4. an annular flange formed on one end of said core for seating on said inwardly extending annular flange and to retain said core in uniform spaced relation inwardly relative to said pair of aligned hollow projections;
      5. an annular flange formed by the other end of said core to retain said core in uniform spaced relation inwardly relative to said pair of aligned hollow projections; and
   e. a flange secured with said external annular flange and engaging said annular flange formed by the other end of said core for closing said other end of said core and retaining said core seated on said inwardly extending flange and spaced inwardly uniformly of said pair of aligned hollow projections throughout the extent of said uniform sized filter receiving section.

2. The invention of claim 1 wherein said longitudinally extending ribs are secured on the inner periphery of said core.

3. The invention of claim 1 wherein said longitudinally extending ribs are secured on the outer periphery of said core.

4. The invention of claim 1 including a member extending across said core adjacent the end nearest said external flange on one of said projections to assist in removal of said core from the T connection.

5. The invention of claim 1 wherein said annular flange formed on said filter member is of greater diameter than said filter member for engaging between said flanges which are secured together.

* * * * *